(12) United States Patent
Choi

(10) Patent No.: US 7,394,512 B2
(45) Date of Patent: Jul. 1, 2008

(54) LIQUID CRYSTAL DISPLAY DEVICE

(75) Inventor: Kyung-Ho Choi, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 55 days.

(21) Appl. No.: 11/282,248

(22) Filed: Nov. 18, 2005

(65) Prior Publication Data

US 2006/0132690 A1 Jun. 22, 2006

(30) Foreign Application Priority Data

Nov. 26, 2004 (KR) .................... 10-2004-0098265

(51) Int. Cl.
*G02F 1/1337* (2006.01)
(52) U.S. Cl. .................... 349/129; 349/126; 349/106
(58) Field of Classification Search ................ 349/123, 349/129, 96, 117, 106, 50, 63–65, 126, 67
See application file for complete search history.

(56) References Cited

U.S. PATENT DOCUMENTS 6,437,844 B1 * 8/2002 Hattori et al. ............... 349/129

| | | | |
|---|---|---|---|
| 6,593,987 B1 * | 7/2003 | Walton et al. | 349/129 |
| 6,903,796 B2 * | 6/2005 | Kataoka | 349/178 |
| 7,133,020 B2 * | 11/2006 | Chino et al. | 345/102 |
| 2001/0005247 A1 * | 6/2001 | Kikkawa | 349/117 |
| 2002/0030777 A1 * | 3/2002 | Noguchi et al. | 349/123 |

FOREIGN PATENT DOCUMENTS

KR       2001-0102744       11/2001

OTHER PUBLICATIONS

Korean Patent Abstracts, Publication No. 1020010102744 A, dated Nov. 16, 2001, in the name of Man Hwan Lee et al.

* cited by examiner

*Primary Examiner*—Thoi V Duong
(74) *Attorney, Agent, or Firm*—Christie, Parker & Hale, LLP

(57) ABSTRACT

A liquid crystal display device (LCD) is provided, in which a first alignment layer is formed to have at least a pair of domains having alignment directions that are perpendicular to each other on a unit pixel, a second alignment layer is formed in the same direction as the first alignment layer, and an optically compensated bend (OCB) mode liquid crystal layer is disposed between the first and second alignment layers to have at least a pair of domains having alignment directions that are perpendicular to each other, so that horizontal and vertical viewing angles can be improved and phase transition voltage can be lowered.

17 Claims, 10 Drawing Sheets

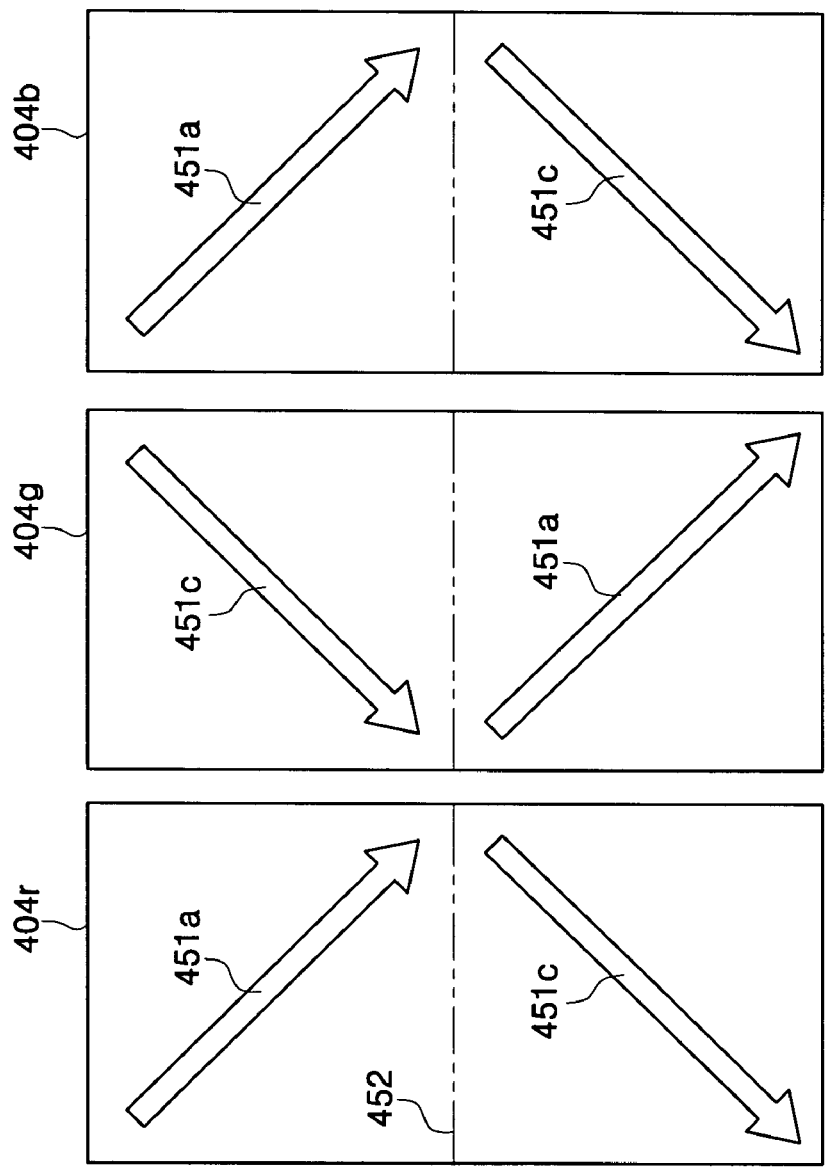

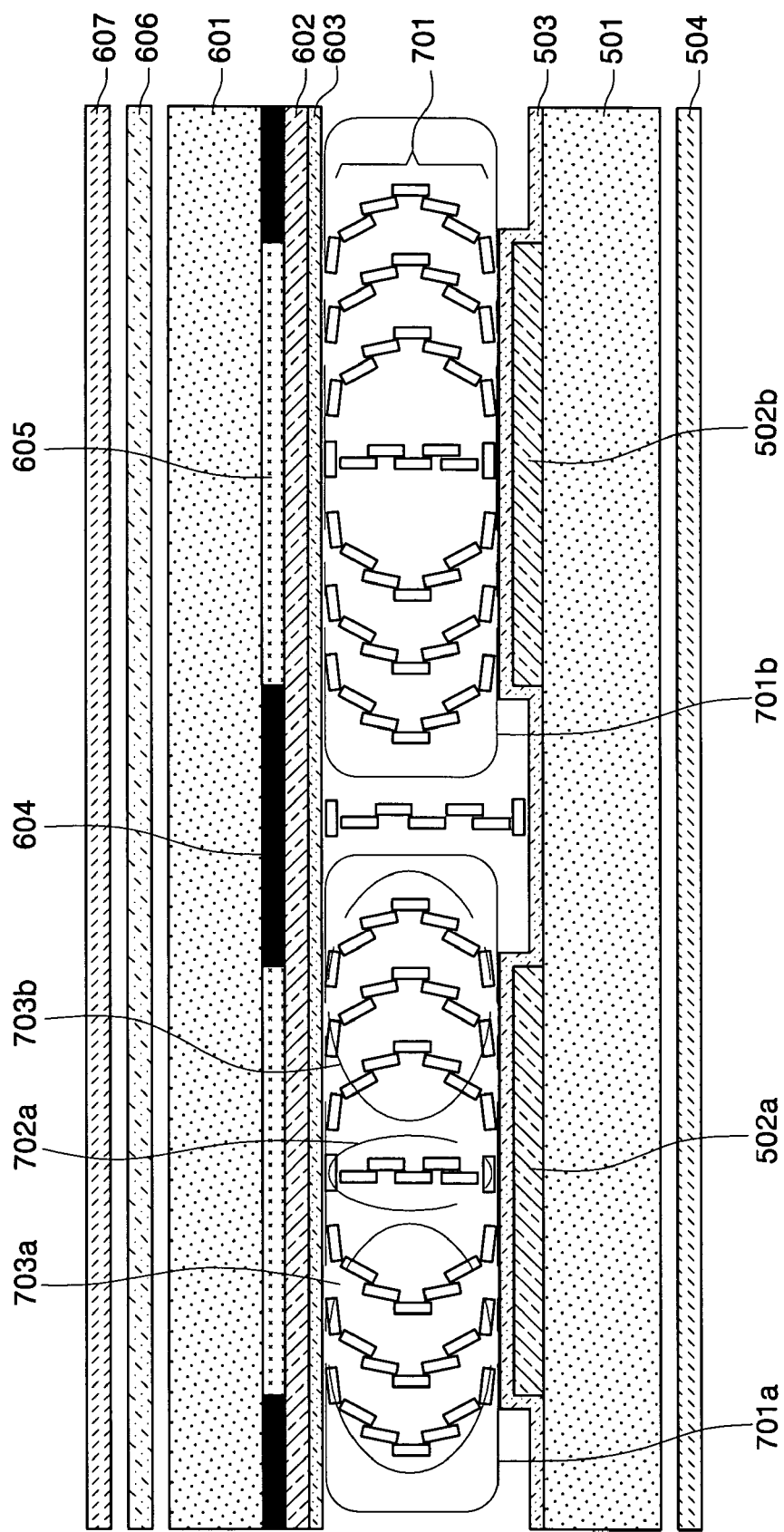

LIQUID CRYSTAL DISPLAY DEVICE

CROSS-REFERENCE TO RELATED APPLICATION

This application claims priority to and the benefit of Korean Patent Application No. 10-2004-0098265, filed Nov. 26, 2004, the entire content of which is incorporated herein by reference.

BACKGROUND OF THE INVENTION

1. Field of the Invention

The present invention relates to a liquid crystal display device (LCD) and, more particularly, to an LCD having wide vertical and horizontal viewing angles and including first and second alignment layers for forming a liquid crystal layer that easily makes a transition to an initial bend phase.

2. Description of the Related Art

Nowadays, in order to overcome the shortcomings of conventional display devices such as cathode ray tubes (CRTs) that are heavy and large-sized, much attention is being paid to flat panel display devices (FPDs), for example, LCDs, organic light emitting display devices (OLEDs), and plasma display panels (PDPs).

In a typical LCD, liquid crystals are injected between two substrates including electrodes for generating an electric field. The electric field is generated between the substrates by the application of different electric potentials to the electrodes, so that the arrangement of liquid crystal (LC) molecules is changed. Thus, optical transmittance is controlled so as to display an image on a screen.

FIGS. 1A and 1B are perspective views illustrating an operating principle of a twisted nematic (TN) mode LCD, which is the most representative type of LCD. Referring to FIG. 1A, the TN mode LCD includes a first substrate 101, a second substrate 103, a light source (not shown), and a liquid crystal layer 106. A first electrode (not shown) and a first alignment layer (not shown) are formed on one surface of the first substrate 101, and a first polarizer 102 is formed on the other surface thereof. A second electrode (not shown) and a second alignment layer (not shown) are formed on one surface of the second substrate 103, and a second polarizer 104 is formed on the other surface thereof. The light source supplies light 105 from above the other surface of the second substrate 103. The liquid crystal layer 106 is filled between the first and second substrates 101 and 103.

A polarization axis of the first polarizer 102 is located in the same direction as a direction 107 in which the first alignment layer formed on one surface of the first substrate 101 is rubbed. A direction 108 in which the second alignment layer formed on one surface of the second substrate 103 is rubbed is perpendicular to the direction 107 in which the first alignment layer is rubbed. A polarization axis of the second polarizer 104 is located in the same direction as the direction 108 in which the second alignment layer is rubbed.

Referring to FIG. 1A, in an inactivated state where no voltage is applied between the first and second electrodes, it can be seen that the major axes (i.e., local optical axes) of LC molecules of the liquid crystal layer 106 filled between the first and second substrates 101 and 103 are gradually twisted due to the directions 107 and 108 in which the first and second alignment layers are rubbed. Thus, an LC molecule 106a close to one surface of the first substrate 101 is twisted at an angle of 90° to an LC molecule 106b close to one surface of the second substrate 103. As a result, the light 105 emitted from the light source is linearly polarized by the second polarizer 104 (refer to 105a), rotated by the LC molecules of the liquid crystal layer 106 (refer to 105b), and then externally emitted through the first polarizer 102 having the polarization axis perpendicular to that of the second polarizer 104 (refer to 105c). Referring to FIG. 1B, in an activated state where a voltage is applied between the first and second electrodes, LC molecules of the liquid crystal layer 106 are not twisted any more and become parallel to each other due to an electric field generated by the voltage. Thus, light 105a obtained by linearly polarizing the incident light 105 is not rotated any more and is wholly absorbed in the first polarizer 102.

However, the TN mode LCD has narrow horizontal and vertical viewing angles and a slow response speed. Thus, optically compensated bend (OCB) mode LCDs have been proposed to solve the problems of the TN mode LCD, but it is still necessary to improve horizontal and vertical viewing angles.

SUMMARY OF THE INVENTION

An exemplary embodiment of the present invention, therefore, solves aforementioned problems associated with conventional devices and methods by providing a liquid crystal display device (LCD), which has wide vertical and horizontal viewing angles and includes first and second alignment layers for forming a liquid crystal layer that easily makes a transition to an initial bend phase.

In an exemplary embodiment of the present invention, an LCD includes a first substrate including a first alignment layer and a first electrode; a second substrate opposite to the first substrate and including a second alignment layer and a second electrode; and an OCB mode liquid crystal layer disposed between the first and second substrates, wherein an alignment layer formed on a unit pixel of the first alignment layer includes at least a pair of domains having alignment directions that are perpendicular to each other and the second alignment layer is formed in the same direction as the first alignment layer.

BRIEF DESCRIPTION OF THE DRAWINGS

The above and other features of the present invention will be described in reference to certain exemplary embodiments thereof with reference to the attached drawings in which:

FIGS. 4, 5A, 5B, and 6 are plan views and a cross-sectional view, respectively, of an OCB mode LCD according to an exemplary embodiment of the present invention.

DETAILED DESCRIPTION

Figure 1A:
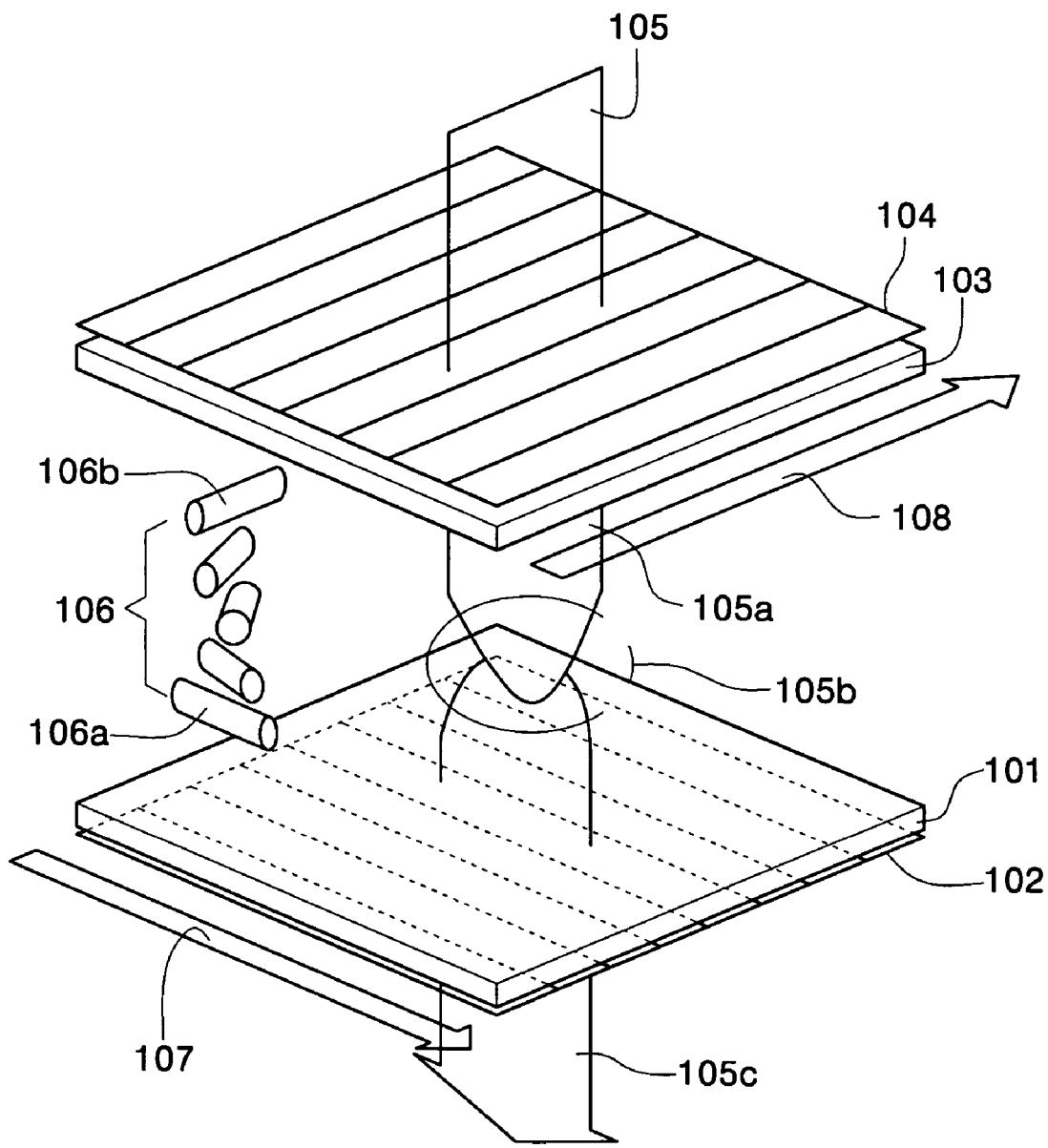
FIGS. 1A and 1B are perspective views illustrating an operating principle of a TN mode liquid crystal display device (LCD), which is the most representative type of LCD.

The present invention will now be described in detail with reference to the accompanying drawings, in which exemplary embodiments of the invention are shown. The thicknesses of layers or regions shown in the drawings are exaggerated for clarity. The same reference numerals are used to denote the same elements throughout the specification.

Figure 2A:
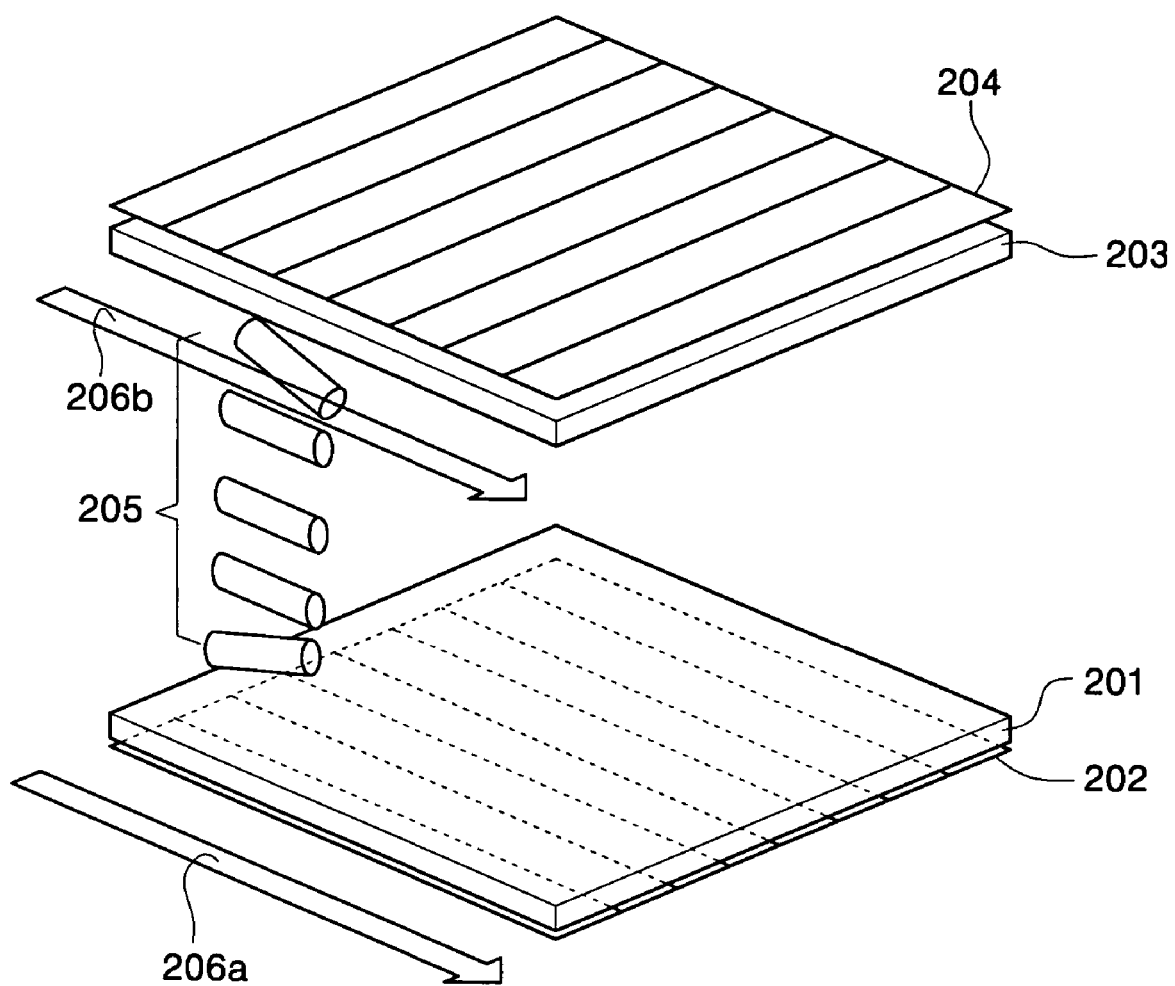
FIGS. 2A, 2B and 2C are perspective views illustrating an operating principle of an OCB mode LCD.
Figure 2B:
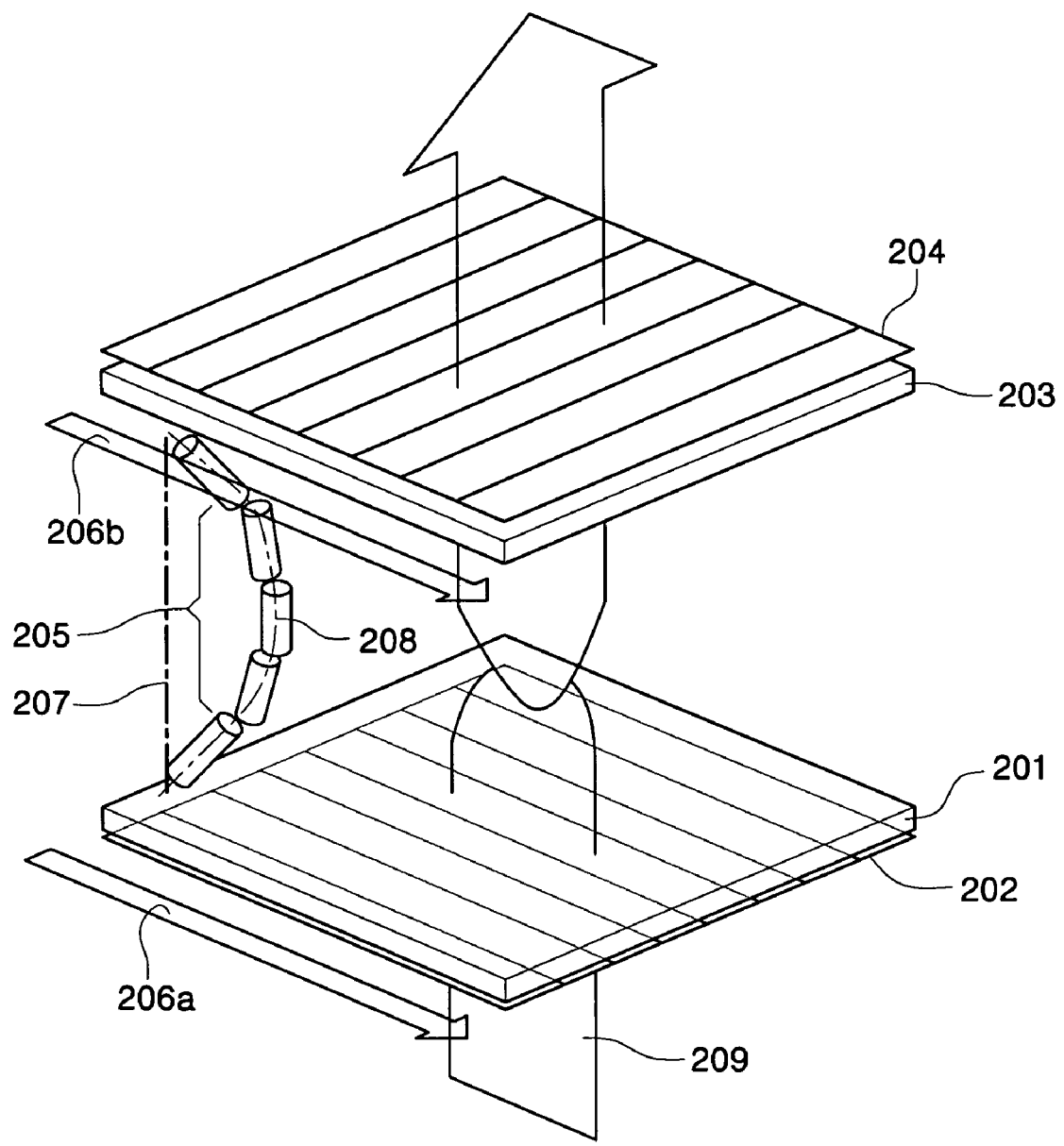
Figure 2C:
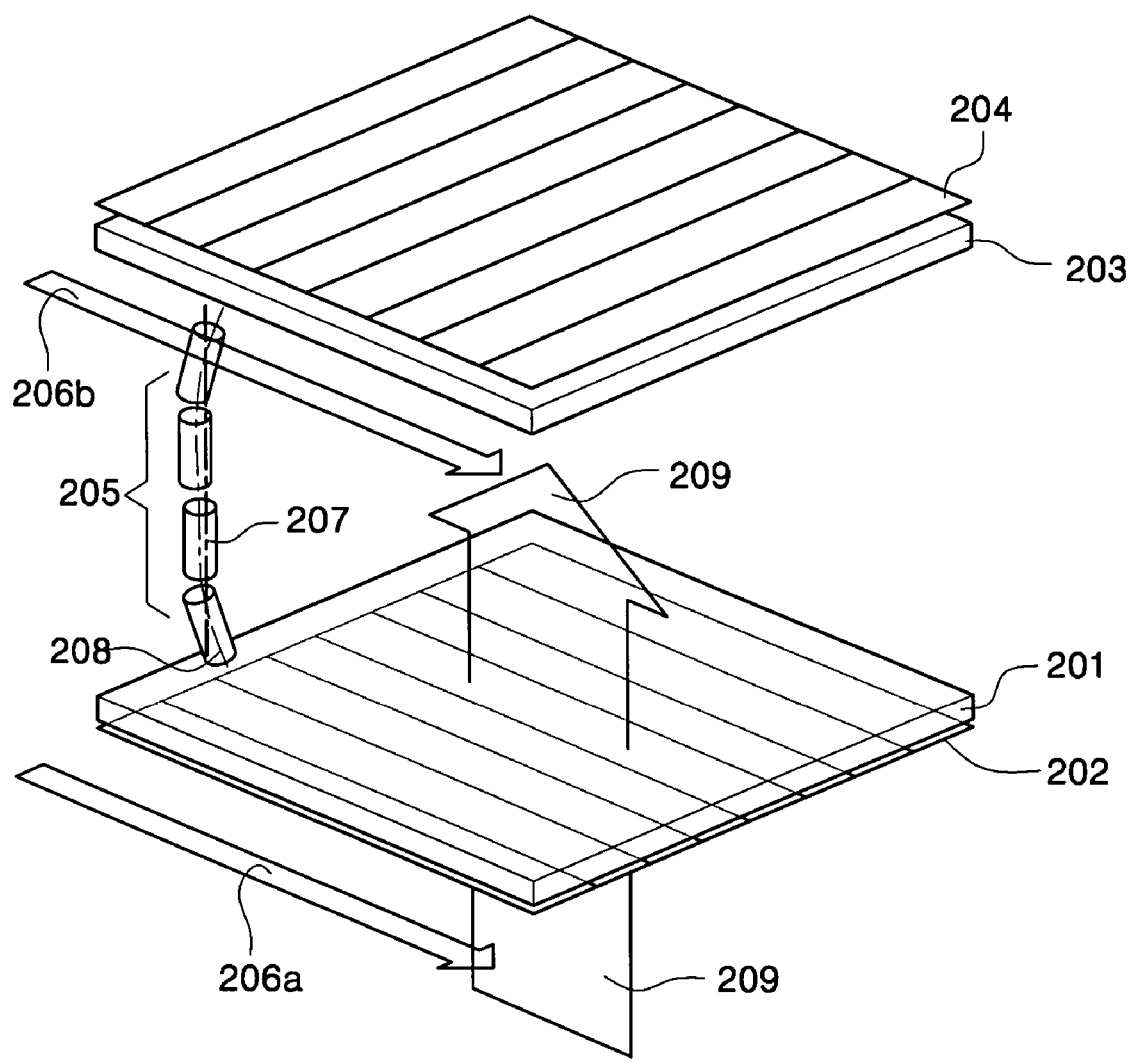

FIGS. 2A, 2B and 2C are perspective views illustrating an operating principle of an OCB mode LCD.

Referring to FIG. 2A, the OCB mode LCD includes a first substrate 201, a second substrate 203 opposite to the first substrate 201, and an OCB mode liquid crystal layer 205. A first electrode (not shown) and a first alignment layer (not shown) are formed on one surface of the first substrate 201, and a first polarizer 202 is formed on the other surface thereof. A second electrode (not shown) and a second alignment layer (not shown) are formed on one surface of the second substrate 203, and a biaxial compensation film (not shown) and a second polarizer 204 are formed on the other surface thereof. The liquid crystal layer 205 is filled (i.e., disposed) between the first and second substrates 201 and 203.

In this case, the polarization axes of the first and second polarizers 202 and 204 are perpendicular to each other.

The liquid crystal layer 205 has a thickness of 1.5 to 2.5 μm. Thus, a space between the first and second substrates 201 and 203 is also 1.5 to 2.5 μm. The liquid crystal layer 205 typically includes liquid crystals with positive dielectric anisotropy.

In this case, a direction 206a in which the first alignment layer is rubbed is the same as a direction 206b in which the second alignment layer is rubbed. In other words, the first and second alignment layers are formed in the same direction. The first and second alignment layers are formed such that LC molecules, which are filled between the first and second substrates 201 and 203 and close to the first and second alignment layers, have a pretilt angle of 5° to 20°. Also, each of the first and second alignment layers is formed to a thickness of 500 to 1000 Å (where Å is equal to $10^{-8}$ cm).

When no voltage is applied between the first and second electrodes, the LC molecules of the liquid crystal layer 205 are naturally arranged in a splay phase due to the properties of the first and second alignment layers, the thickness of the liquid crystal layer 205, and/or the intrinsic properties of the LC molecules.

Referring to FIG. 2B, when a voltage for phase transition to the bend phase is applied between the first and second electrodes, because a line 208 that connects the centers of the LC molecules is affected by the directions 206a and 206b in which the first and second alignment layers are rubbed, the LC molecules of the liquid crystal layer 205 are arranged in a convex bend phase in the rubbed directions 206a and 206b with respect to a vertical line 207 perpendicular to the first and second substrates 201 and 203. Here, the phase transition voltage is about 25 to 30 V.

In this case, the liquid crystal layer 205 that is phase-transitioned to the bend phase keeps almost the same shape in one domain. Typically, each unit pixel of an LCD includes one domain.

Light 209 is incident on the other surface of the first substrate 201, linearly polarized by the first polarizer 202, transmitted through the phase-transitioned liquid crystal layer 205, and externally emitted through the second substrate 203 and the second polarizer 204. While the light 209 is being transmitted through the phase-transitioned liquid crystal layer 205, birefringence is caused by the liquid crystal layer 205.

Referring to FIG. 2C, when a driving voltage is applied between the first and second electrodes, the LC molecules of the liquid crystal layer 205 are rearranged such that the line 208 that connects the centers of the LC molecules is similar to the vertical line 207, and the light 209 cannot be transmitted through the second polarizer 204 because birefringence is not caused any more.

Thereafter, when no driving voltage is applied between the first and second electrodes, the liquid crystal layer 205 is arranged to the bend phase as described with reference to FIG. 2B so that the light 209 can be transmitted again. At this time, the phase transition voltage is maintained between the first and second electrodes.

Figure 1B:
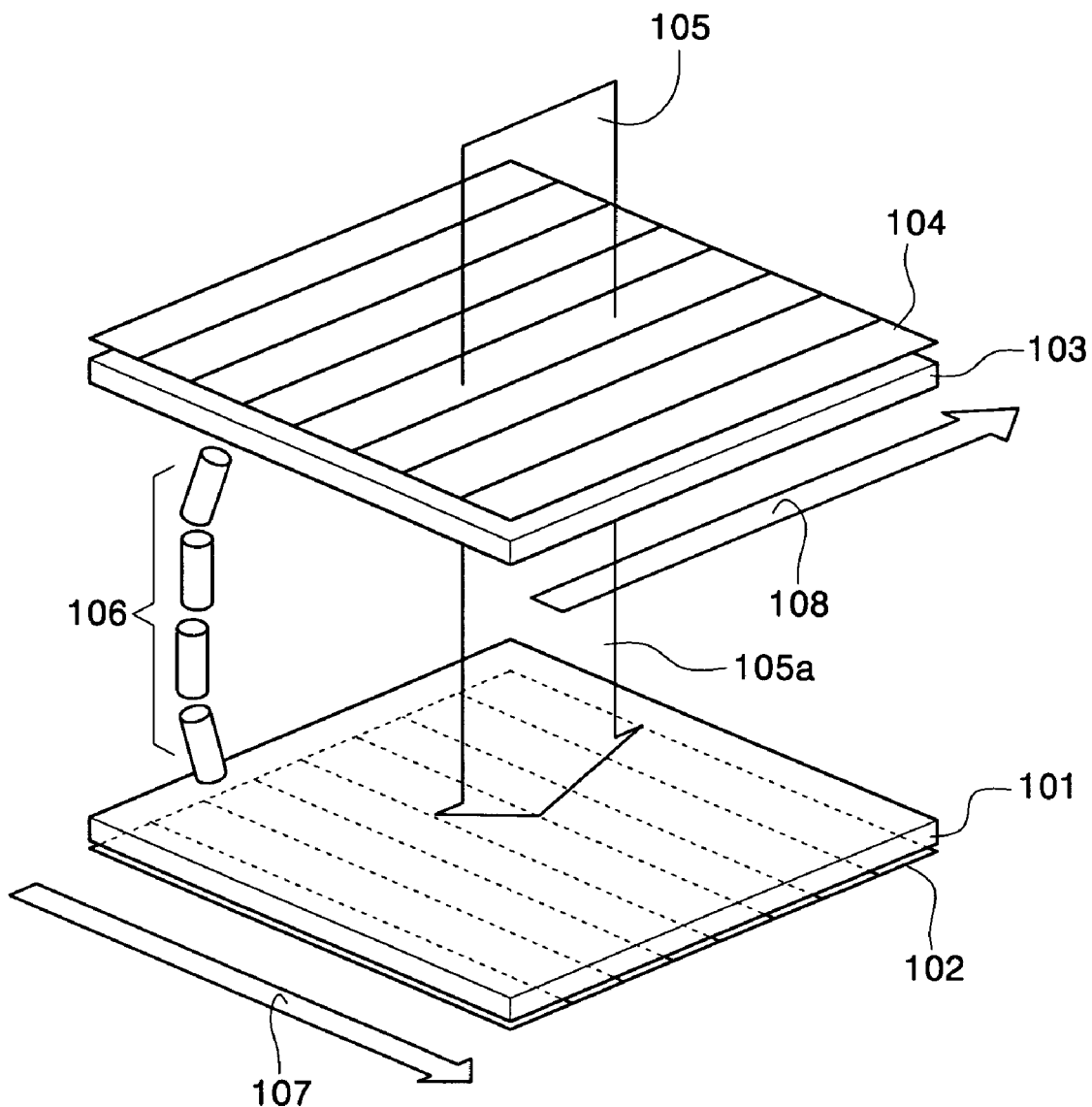
Figure 3A:
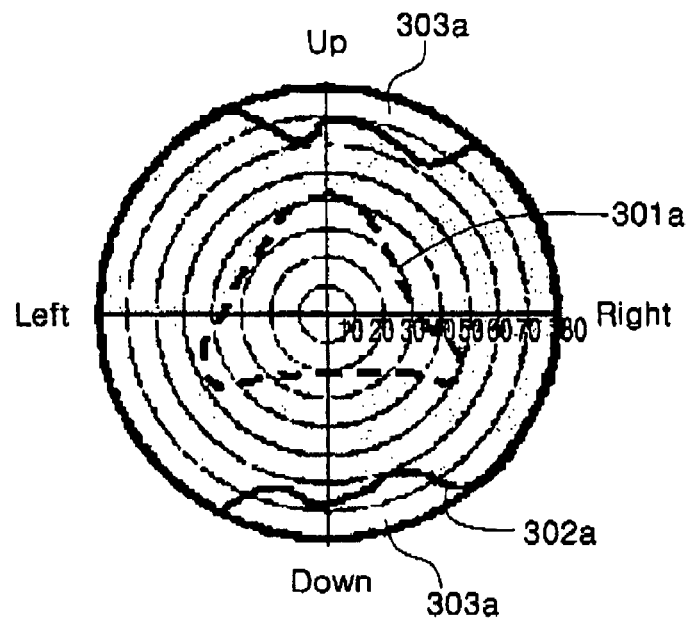
FIGS. 3A and 3B are diagrams illustrating viewing angles of a TN mode LCD and an OCB mode LCD.
Figure 3B:
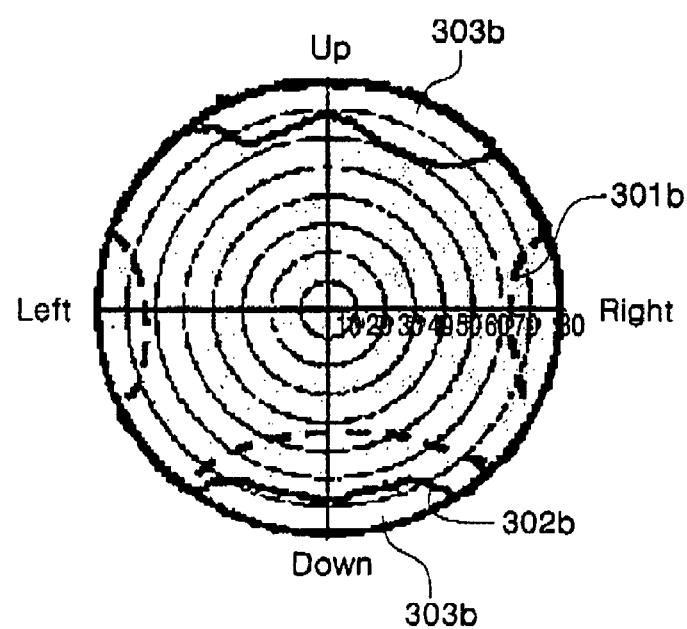

FIGS. 3A and 3B are diagrams illustrating viewing angles of the TN mode LCD as described with reference to FIGS. 1A and 1B and the OCB mode LCD as described with reference to FIGS. 2A and 2B. Specifically, FIG. 3A shows the color shifts of the TN mode and OCB mode LCDs, while FIG. 3B shows the contrast ratios thereof.

In this case, each of the TN mode LCD and the OCB mode LCD has 854×480 pixels, a pixel pitch of 0.2865×0.2865 mm, and a contrast ratio of 400:1.

Referring to FIGS. 3A and 3B, when a color shift 301a and a contrast ratio 301b of the TN mode LCD are compared with a color shift 302a and a contrast ratio 302b of the OCB mode LCD, it can be observed that the OCB mode LCD has better characteristics.

However, given only the color shift 302a and the contrast ratio 302b of the OCB mode LCD, it can be seen that horizontal characteristics are excellent, but vertical characteristics 303a and 303b are not very good. That is, a horizontal viewing angle is 160°, whereas a vertical viewing angle is 140°.

Figure 4:
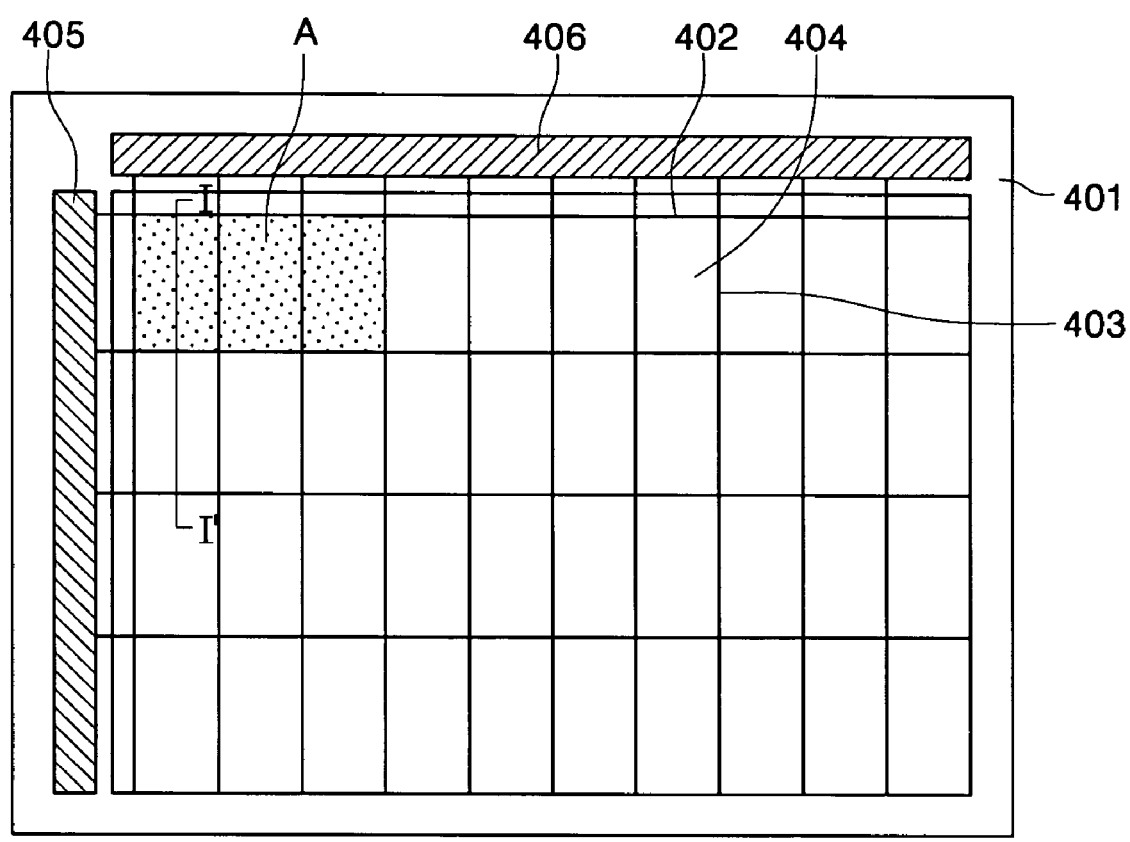
Figure 5A:
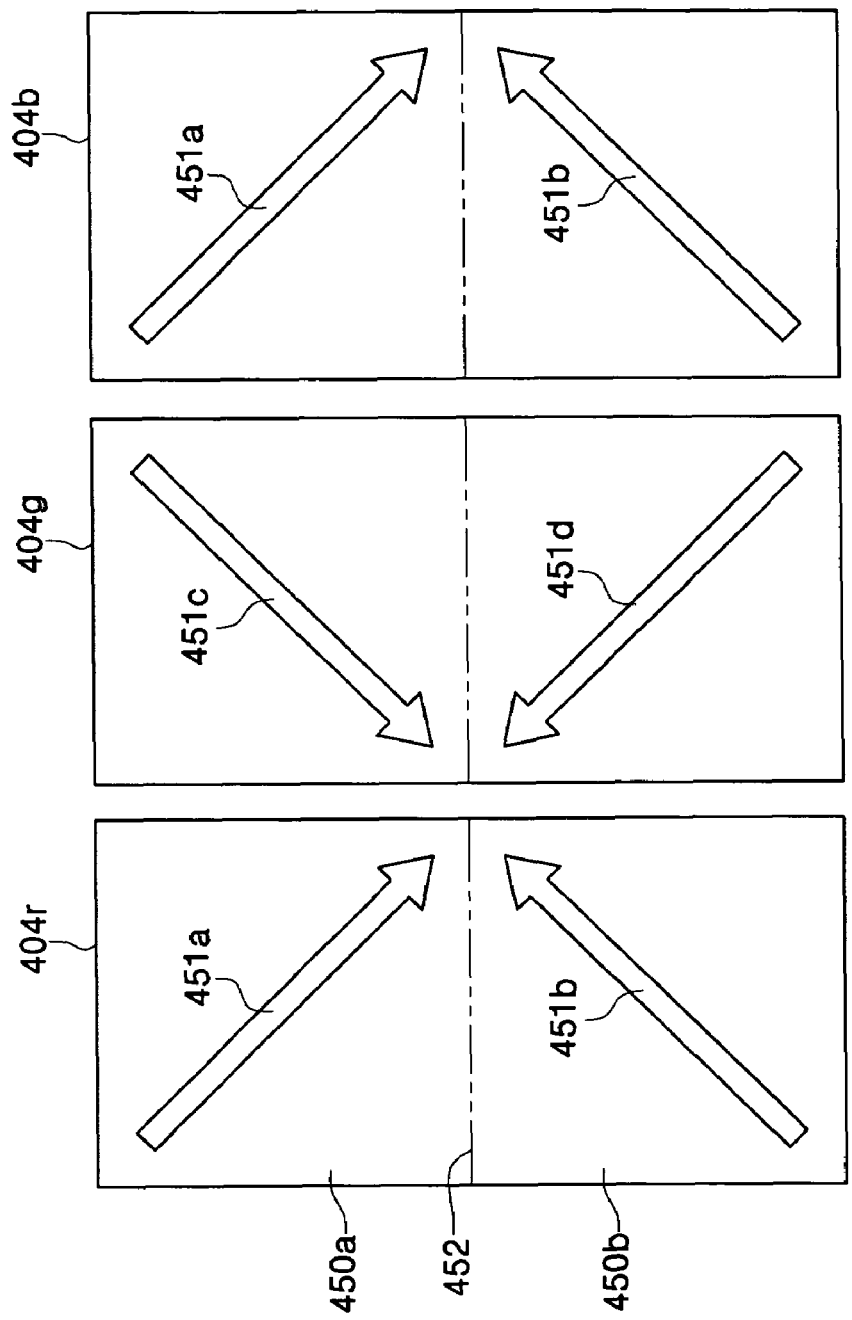

FIGS. 4, 5A, 5B, and 6 are plan views and a cross-sectional view, respectively, of an OCB mode LCD according to an exemplary embodiment of the present invention. FIGS. 5A and 5B are magnified plan views of 3 unit pixels of FIG. 4, and FIG. 6 is a cross-sectional view taken along the line I-I' of FIG. 4.

Referring to FIG. 4, the OCB mode LCD including an emission region and a peripheral region is disposed on a substrate 401, which is a glass substrate or a plastic substrate. The emission region includes unit pixels 404 defined by gate lines 402 and data lines 403. The peripheral region includes a gate driver 405 and a data driver 406. In this case, each of the unit pixels 404 is one of red (R), green (G), and blue (B) pixels.

While not shown in the drawings, a first electrode and a first alignment layer are formed in the unit pixel 404 of the emission region. Also, a thin film transistor (TFT) and a capacitor may be formed in the unit pixel 404 of the emission region.

Referring to FIGS. 5A and 5B, which are plan views illustrating directions in which first alignment layers are rubbed in a region A including three unit pixels (i.e., red, green, and blue pixels) of FIG. 4, the first alignment layer formed in each of the unit pixels 404, namely, a red pixel 404r, a green pixel 404g, and a blue pixel 404b, includes a first domain 450a and a second domain 450b, which are rubbed in different directions. Specifically, the first domain 450a is formed in one direction of a first rubbing direction 451a for rubbing the first alignment layer from an upper-left end of the unit pixel toward a lower-right end thereof, a second rubbing direction 451b for rubbing the first alignment layer from a lower-left end of the unit pixel toward an upper-right end thereof, a third rubbing direction 451c for rubbing the first alignment layer from the upper-right end toward the lower-left end, and a fourth rubbing direction 451d for rubbing the first alignment layer from the lower-right end toward the upper-left end. A second domain 450b is formed in one direction of the first through fourth rubbing directions 451a, 451b, 451c, and 451d other than the rubbing direction in which the first domain 450a is formed. Further, the first and second domains 450a and 450b should be rubbed in directions that are perpendicular to each other.

The first and second alignment layers may be formed using a spinning process, a dipping process, a roller coating process or any other suitable process. By way of example, the first and second alignment layers may be formed using a roller coating process. That is, in order to form the first and second alignment layers, when each of the first and second alignment layers is rubbed in respectively different directions, a pattern mask for opening only domains that will be rubbed in one direction is formed, the alignment layer is rubbed, and the pattern mask is removed. Thereafter, domains that will be rubbed in another direction are rubbed using another pattern mask in the same manner as described above.

As the unit pixel 404 includes the first and second domains 450a and 450b rubbed in directions that are perpendicular to each other, the vertical viewing angle described with reference to FIGS. 3A and 3B can be improved. This is because when one unit pixel includes two domains rubbed in respectively different directions, a portion of the alignment layer rubbed in one direction can make up for another portion of the alignment layer rubbed in another direction.

A disclination line 452 is generated between the first and second domains 450a and 450b that are rubbed in different directions. Similar to disclination lines between unit pixels, the disclination line 452 in a unit pixel lowers a phase transition voltage.

FIGS. 5A and 5B illustrate two selected from exemplary embodiments in which the red pixel 404r, the green pixel 404g, and the blue pixel 404b are formed using a combination of the first, second, third, and fourth rubbing directions 451a, 451b, 451c, and 451d. Although FIGS. 5A and 5B illustrate that one unit pixel includes two domains, other even-numbered domains, such as four, six, or eight domains, can be formed in one unit pixel.

Referring to FIG. 6, first electrodes 502a and 502b are formed on one surface of a first substrate 501, which is a glass substrate or a plastic substrate, and a first alignment layer 503 is formed on the substrate 501.

The first alignment layer 503 is formed on the first electrodes 502a and 502b such that it includes a first domain and a second domain rubbed in the direction perpendicular to each other as described with reference to FIGS. 5A and 5B.

A second electrode 602 and a second alignment layer 603 are formed on a second substrate 601, which is a glass substrate or a plastic substrate. The second alignment layer 603 corresponds to the first alignment layer 503 such that domains rubbed in the same direction face each other.

The first electrodes 502a and 502b and the second electrode 602 are formed of transparent conductive insulating materials, such as indium tin oxide (ITO) or indium zinc oxide (IZO). Each of the first electrodes 502a and 502b has a thickness of 1000 to 3000 Å and a width of 30 to 60 μm, and a space between the first electrodes 502a and 502b is about 5 to 15 μm.

In this case, a color filter 605 including a black matrix (BM) 604 may be formed between the second electrode 602 and the second substrate 601.

Also, a first polarizer 504 may be adhered to the other surface of the first substrate 501. Also, a light source device, i.e., a backlight including a light source having a red/green/blue LED or a white (W) LED, a reflector sheet, and a diffuser sheet may be adhered on the first polarizer 504.

Further, a biaxial compensation film 606 and a second polarizer 607 may be formed on the other surface of the second substrate 601. Here, the polarization axes of the first and second polarizers 504 and 607 are perpendicular to each other.

Thereafter, an OCB mode liquid crystal layer 701 is filled between the first and second substrates 501 and 601, thereby completing the OCB mode LCD.

When a phase transition voltage is applied between the first electrodes 502a and 502b and the second electrode 602 of the completed OCB mode LCD, in each of liquid crystal layers 701a and 701b, which is disposed in one unit pixel (i.e., on one of the first electrodes 502a and 502b), two domains 703a and 703b are arranged symmetrically with respect to a disclination line 702a formed in the unit pixel, due to the first and second alignment layers 503 and 603. Also, LC molecules in the domain 703a are arranged in the direction perpendicular to the LC molecules in the domain 703b. The LC molecules of one unit pixel in other embodiments may be arranged in other even-numbered domains, such as four, six, or eight domains.

In the exemplary embodiments of the present invention as described above, vertical and horizontal viewing angles can be widened, and the transition to a bend phase can be easily made by forming a disclination line in a unit pixel.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A liquid crystal display device comprising:
a first substrate including a first alignment layer and a first electrode disposed on one surface thereof;
a second substrate opposite to the first substrate and including a second alignment layer and a second electrode disposed on one surface thereof; and
an optically compensated bend (OCB) mode liquid crystal layer disposed between the first and second substrates,
wherein an alignment layer formed on a unit pixel of the first alignment layer includes at least a pair of rubbed domains having alignment directions perpendicular to each other, the perpendicular alignment directions defined through rubbing, the unit pixel being one of red, green and blue pixels, and the second alignment layer is formed in a same direction as the first alignment layer, and
wherein one of the domains has one alignment direction among a first alignment direction corresponding to rubbing the first alignment layer from an upper-left end of the unit pixel toward a lower-right end thereof, a second alignment direction corresponding to rubbing the first alignment layer from a lower-left end of the unit pixel toward an upper-right end thereof,
a third alignment direction corresponding to rubbing the first alignment layer from the upper-right end toward the lower-left end, and a fourth alignment direction corresponding to rubbing the first alignment layer from the lower-right end toward the upper-left end, and each of the domains has an alignment direction different from the alignment directions of other ones of the domains.

2. The device according to claim 1, wherein one of the domains of the first alignment layer and a corresponding one of the domains of the second alignment layer, are rubbed in a same direction.

3. The device according to claim 1, wherein each of the first and second alignment layers provides a pretilt angle of 5° to 20° to liquid crystals of the liquid crystal layer.

4. The device according to claim 1, wherein each of the first and second alignment layers has a thickness of 500 to 1000 Å.

5. The device according to claim 1, further comprising:
a first polarizer disposed on the other surface of the first substrate; and
a biaxial compensation film and a second polarizer disposed on the other surface of the second substrate.

6. The device according to claim 5, wherein the first and second polarizers have polarization axes perpendicular to each other.

7. The device according to claim 1, wherein the liquid crystal layer has a thickness of 1.5 to 2.5 μm.

8. The device according to claim 1, wherein the liquid crystal layer includes liquid crystals with positive dielectric anisotropy.

9. The device according to claim 1, wherein the first electrode is formed of a transparent conductive material.

10. The device according to claim 1, wherein the first electrode is formed of one selected from an indium tin oxide (ITO) and an indium zinc oxide (IZO).

11. The device according to claim 1, wherein the first electrode has a thickness of 1000 to 3000 Å.

12. The device according to claim 1, further comprising a light source device disposed on the other surface of the first substrate.

13. The device according to claim 12, wherein the light source device includes a reflector sheet, a diffuser sheet, and a light emitting diode (LED).

14. The device according to claim 13, wherein the LED comprises a red (R) LED, a green (G) LED and/or a blue (B) LED.

15. The device according to claim 13, wherein the LED is a white (W) LED.

16. The device according to claim 1, further comprising a color filter interposed between the second electrode and the second substrate.

17. The device according to claim 1, wherein the liquid crystal layer includes OCB mode liquid crystals.

* * * * *